(12) United States Patent
Mullis

(10) Patent No.: US 6,729,666 B2
(45) Date of Patent: May 4, 2004

(54) HUNTING AID AND METHOD OF USE

(76) Inventor: James Mullis, 915 Park St., Troy, AL (US) 36081

(*) Notice: Subject to any disclaimer, the term of this patent is extended or adjusted under 35 U.S.C. 154(b) by 0 days.

(21) Appl. No.: 10/061,258

(22) Filed: Feb. 4, 2002

(65) Prior Publication Data

US 2002/0074813 A1 Jun. 20, 2002

Related U.S. Application Data

(60) Provisional application No. 60/256,617, filed on Feb. 2, 2001.

(51) Int. Cl.$^7$ .............................. B65G 7/12; A22C 15/00
(52) U.S. Cl. ....................... 294/81.56; 294/2; 294/15; 294/153; 452/189
(58) Field of Search ........................ 294/2, 15, 26, 294/67.1, 67.21, 74, 81.1, 81.2, 81.3, 81.4, 81.41, 81.5, 81.51, 81.52, 81.55, 81.56, 152–154, 155, 157, 170, 103, 921; 452/152, 187–190, 192

(56) References Cited

U.S. PATENT DOCUMENTS

| | | | | |
|---|---|---|---|---|
| 458,018 A | * | 8/1891 | Curtis | 294/81.56 |
| 1,189,966 A | * | 7/1916 | Kellogg | 452/187 |
| 1,350,632 A | * | 8/1920 | Albrecht | 294/81.56 |
| 1,624,320 A | * | 4/1927 | Demmer | 294/81.2 |
| 1,743,346 A | * | 1/1930 | Helser | 452/187 |
| 2,716,571 A | * | 8/1955 | Silva | 294/81.56 |
| 4,243,164 A | * | 1/1981 | Burlison et al. | 294/146 |
| 5,145,224 A | * | 9/1992 | Welk | 294/153 |
| 5,304,091 A | * | 4/1994 | Wilkinson | 452/192 |
| 6,186,882 B1 | * | 2/2001 | Adams et al. | 452/189 |

* cited by examiner

Primary Examiner—Eileen D. Lillis
Assistant Examiner—Paul T. Chin
(74) Attorney, Agent, or Firm—Clark & Brody

(57) ABSTRACT

A combination hanging and dragging hunting aid comprises a handle having a pair of opposing free ends. The handle has means for supporting the handle such as a loop or other surface. A pair of removable hooks are attached to each free end of the handle, with the hooks being adapted to hook to an animal so that the animal can be hung via the handle. One or more flexible members are provided that can extends from one or more end of the handle. The flexible member terminates in a hook for attaching to a portion of an animal to allow the animal to be dragged using the handle. By selecting the proper position of the hooks, the animal can be first dragged to a site, and then, by repositioning the hooks, the animal can be hung up.

12 Claims, 2 Drawing Sheets

HUNTING AID AND METHOD OF USE

This application claims priority from application No. 60/265,617 filed on Feb. 2, 2001 under 35 USC 119(e).

FIELD OF THE INVENTION

The present invention is directed to hunting aids, and in particular, to a combination drag and hook device for transporting and hanging animals that have been obtained through hunting, and a cutting device designed to remove the anal tract of an animal as part of field dressing the animal.

BACKGROUND ART

Two vital steps in hunting are moving the animal once it has been downed and properly field dressing the animal.

It is imperative that the animal is properly field dressed or the meat of the animal can be spoiled. For example, if a hunter would pierce the animal's bladder while removing the rectum, fluid from the bladder would foul the meat and make the animal unfit for human consumption.

In addition and in most instances, the animal must be dragged from the site where it has been downed and hung vertically. Typically, hunters use one device to drag the animal, and a second device to hang the animal up.

In both of these instances, improved hunting aids are needed to avoid accidental bladder piercing, and make it easier to both drag and hang an animal.

The present invention solves both of these problems by providing an improved cutting device for field dressing and a combination dragging and hanging device.

SUMMARY OF THE INVENTION

It is a first object of the present invention to provide an improved hanging and dragging device for animals downed by hunting.

Another object of the invention is to provide an improved cutting device for field dressing animals, particularly one designed to remove the anal tract or rectum and the bladder of an animal.

Other objects and advantages of the present invention will become apparent as a description thereof proceeds.

The hanging and dragging device comprises a handle having a pair of opposing free ends, wherein the handle has means for supporting the handle such as a loop or other surface. A pair of removable hooks are attached to each free end of the handle, with the hooks being adapted to hook to an animal so that the animal can be hung via the handle. A flexible member is provided that extends from each free end of the handle. Each flexible member terminates in a hook for attaching to a portion of an animal to allow the animal to be dragged using the handle.

Each flexible member can be removably attached to each respective free end. Each removable hook can be rotated between a hooking position wherein a hook end faces upward for hanging, and a dragging position wherein the hook end faces downward to allow the hook end to be gripped for dragging. A removable pin can be employed to retain each removable hook in a portion of the handle and to permit hook rotation.

In one embodiment, each free end can have a coupler with an opening to receive an attachment end of the removable hook. Each removable hook can then be retained in the opening by the pin extending through the opening in the coupler and an opening in the attachment end of the hook. The coupler can be either an integral part of the handle or is attached thereto.

Each free end can have an eye opening to receive a portion of the flexible member, and the handle can also employ an eye opening for its support.

The invention also entails a method of dragging and hanging an animal comprising providing a handle having a pair of rotatable hooks on opposing free ends thereof. After an animal has been hunt down, the animal is linked to one or both of the free ends. The free hook or hooks are positioned with a concave part of each hook to be grabbed by a user for dragging the animal. Once the animal is dragged to the selected site, the handle is supported off the ground, and the hooks are rotated so that one free end thereof can be used to hang the animal. The handle can be supported using an eye on the handle and cables can be used to link the animal to the handle for dragging. In a preferred embodiment, cables with hooks at each end are used to link the animal to the free ends of the handle for dragging.

BRIEF DESCRIPTION OF THE DRAWINGS

Reference is now made to the drawings of the invention wherein.

DESCRIPTION OF THE PREFERRED EMBODIMENTS

The present invention offers significant improvements in hunting aids by providing, in one embodiment, the ability to remove the bladder and rectum of the animal without piercing the bladder during field dressing. A second embodiment allows one hunter to first drag an animal and then hang the animal using the same device. The device can also accommodate dragging a large animal using two hunters.

Figure 1:
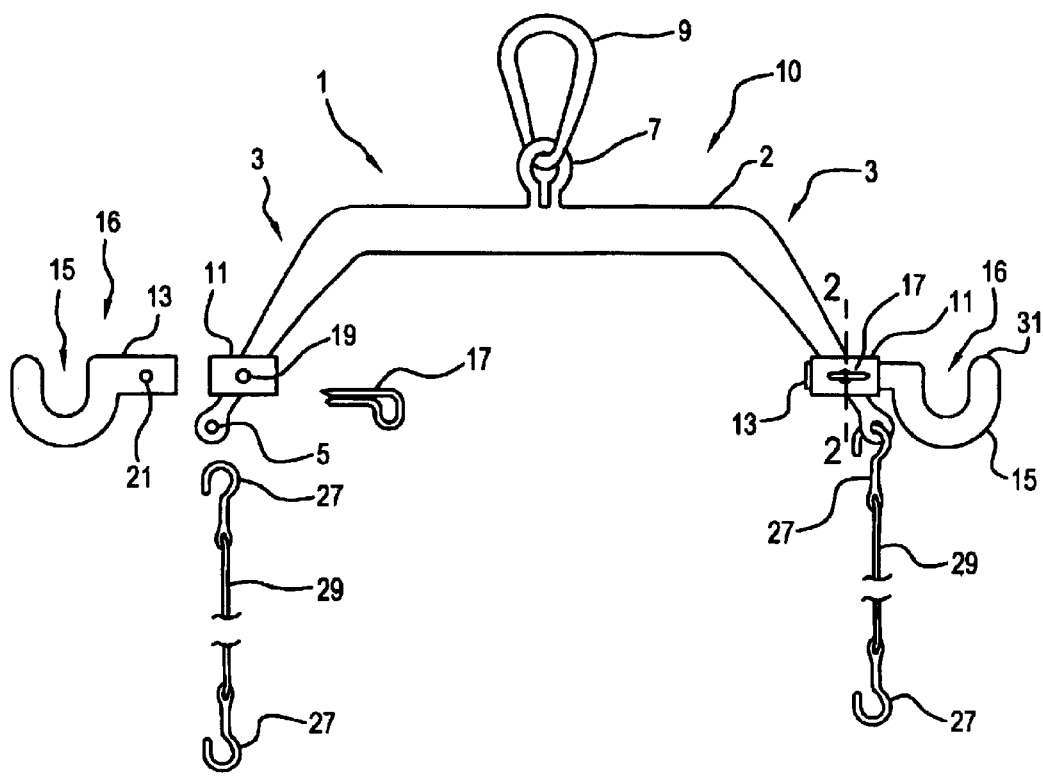
FIG. 1 shows a schematic view of one embodiment of the hanging and dragging device of the invention.

FIG. 1 shows one embodiment of the hanging/dragging device of the invention as reference numeral 10. The device 10 has a handle 1 made up of a handle body 2 and a pair of angled end portions 3. Each of the end portions 3 terminate in an eye 5. Preferably, the handle is about six inches in length, but other dimensions can be used.

The body 2 also has a centrally positioned eye 7. A strap 9 is shown looped in the eye 7. The eye 7 and strap 9 can act as a grip for a hunter to drag one or more animals as described below. Alternatively, a hunter could merely grab the handle 10 and drag the animal. As explained below, the eye 7, with or without the strap 9, can be used to support the handle 1 for hanging. In addition, while a flexible strap is shown, other flexible or rigid items could be used with the eye for dragging and/or hanging, e.g., a metal ring large enough to accommodate a person's hand, a rope or cable, or the like. Further, the eye 7 could be replaced with openings in the handle body 2 or slots or grooves in the body surface, the openings or slots/grooves interfacing with a strap, hook, cable, or the like to support the handle and hooks.

The body 2 and end portions 3 are preferably an integral one-piece design and made of a material capable of withstanding the forces necessary to drag and hang an animal. A preferred material would be a metal, either wrought with the eyes attached by welding, a casting, or the like. While the end portions 3 are angled with respect to a longitudinal axis of the body 1, they could extend at right angles to the axis of the body 1, or be aligned therewith. When the end portions 3 are aligned with the body 1, changes in the cable length or positioning of the couplers as described below may be necessary.

Figure 2:
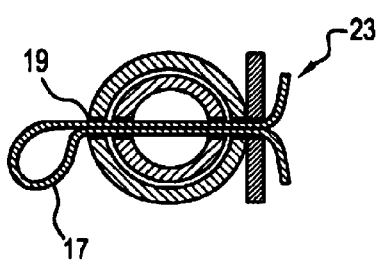
FIG. 2 is a cross section view along the line II—II of FIG. 1.

The end portions 3 also have a pair of cylindrical members 11 that are similar to pipe couplings, hereinafter couplers. The internal diameter of the couplers 11 is sized to slidably receive an end portion 13 of the hooks 16. Referring to FIGS. 1 and 2, the hooks 16 are secured in the couplers 11 by cotter pins 17. The cotter pins 17 extend through openings 19 in the couplers 11, and openings 21 in the hooks 16. The free ends 23 of the pins 17 are folded to prevent the pins 17 from sliding out of the openings 19 and 21.

Figure 3:
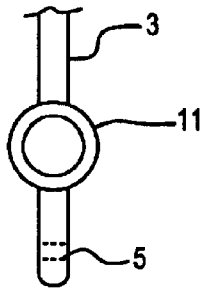
FIG. 3 is a partial side view of an alternative embodiment of the FIG. 1 hunting aid.

The couplers 11 can be attached to the end portions 3 in any fashion, e.g., welding, fasteners, etc. In the alternative, the couplers 11 could be an integral part of the end portions 3 such that each would be a part of the end portion 3, and the eye 5 would then extend from the couplers as shown in FIG. 3.

The hooks 16 function in concert with the eye 7 to hang one or more animals. That is, a tree or the other elevated structure supports the body 1 via the eye 7 and the rope 9. The field dressed animal is then attached to the hook end 15 of the hook 16 to support the animal off the ground, e.g., one hook in each hind leg of the animal, or one hook in one animal. Other modes can be used to support the device using the handle body 2 as noted above.

The eyes 5 of the end portions 3 cooperate with hooks 27 and cables 29 to drag the animal to a selected site. One set of hooks 27 engage the eyes 5 with the other set being used to engage the field dressed animal, e.g., the hind legs of the animal. The cables 29 interconnect the hooks 27 for dragging. The attachment of the hooks 27 to the cables 29 can be done in any fashion, either so that the cables are easily removed from the hooks or with the cable permanently attached to the hooks. Preferably the cables are about two feet in length, but other lengths can be used. Alternative designs for the hooks 27 can be employed, e.g., closed hooks having a pivoting member to allow hook attachment and release. Although cables are exemplified, other items can be used, chains, wire, etc.

The device 10 also facilitates a two-person drag. In this mode, the pins 17 are removed, the hooks 16 are rotated 180° so that the end 31 of the hook portion 15 is facing toward the eye 5, and the pins 17 are replaced. This then allows each of a pair of hunters to grasp each hook portion 15 and drag the animal or animals. When the animal is dragged to the desired site, the pins 17 are removed, the hooks 16 are rotated back to the orientation shown in FIG. 1, and the pins 17 are replaced for hanging. The animal(s) can then be hung.

It should be understood that other designs than the eyes 5 could be employed to connect the hooks 27 and cables 29. Likewise, the eye 7 could be replaced with another design to allow for support of the handle 1. Other attachments can be used in place of the cotter pins to removably secure the hooks 16 the end portions 3. In addition, while couplers are shown, other shapes could be employed, e.g., square cross sections, to couple the hooks to the end portions 3.

Figure 4:
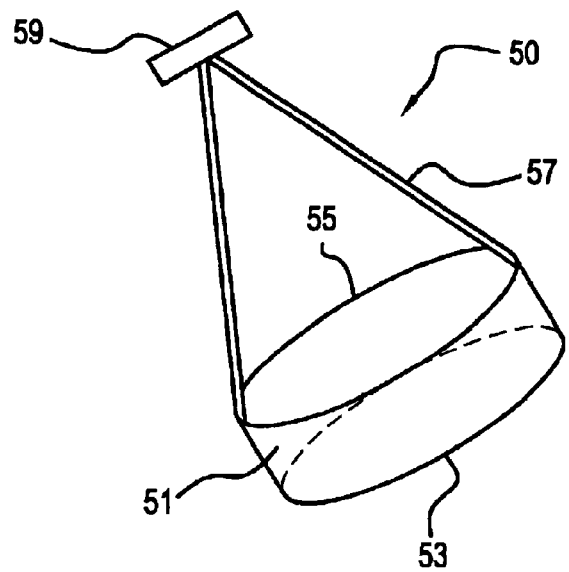
FIG. 4 is a perspective view of one embodiment of the cutting device of the invention.

Referring now to FIG. 4, a cutting device designated by the reference number 50 is shown in perspective. The device 50 is designed to remove the anal tract and the bladder from an animal as described below. The device 50 is metallic and has a cylindrical body 51 having a circular cutting edge 53 at one end thereof. Extending from the edge 53 are a pair of rods 57, each terminating in a handle 59. The rods 57 can be attached to the body 51 and handle 59 in any fashion, but is preferred that the connections are welds.

In use and as part of field dressing an animal, e.g., a deer or hog, the cutting device is used to remove the rectum or anal tract and bladder at one time. Using prior art techniques, the anus is removed by cutting around it with a small knife from the interior or exterior of the animal. Once the cutting is complete, the anus is drawn into the body cavity, and it becomes free with the intestines. This technique runs the risk of piercing the bladder and ruining the animal meat.

This disadvantage is overcome by the cutting tool of the invention. In use, the edge 53 is placed around the anus from the outside of the deer. With the cutting edge in contact with the deer, the handle 59 is rotated to effectively cut out the anus. Unlike a knife edge being wielded by a hunter, the configuration of the circular cutting edge minimizes the chances of piercing the bladder. In fact, when rotating the cutting device and moving it through the deer, the bladder passes through the center of the cylinder 51. Thus, the edge 53 is spaced from the bladder during the rotating and cutting action, thereby minimizing bladder contact.

After a number of uses, the edge 53 can be honed again to provide a sharp edge for continued cutting.

Figure 5:
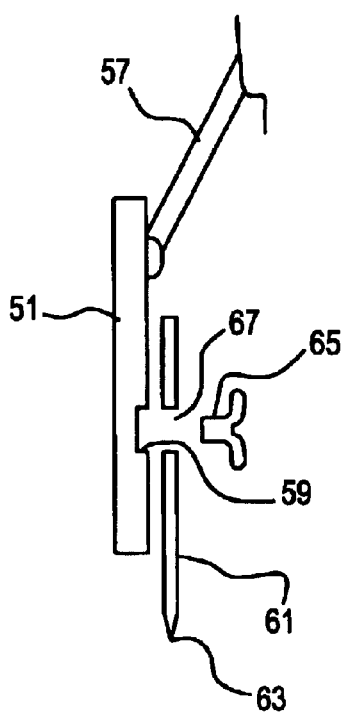
FIG. 5 is a partial view of another embodiment of the device of FIG. 4 with a removable blade.

FIG. 5 shows another embodiment of the cutting device of FIG. 4 wherein a replaceable cutting blade is used instead of the integral cutting edge 53. In this embodiment, a portion of a cylinder 51' is shown. The cylinder 51' is employed in conjunction with a cylindrical cutting blade 61 having a cutting edge 63. The blade 61 is sized to fit snugly within the cylinder 51' so that the proper cutting diameter is attained. In the FIG. 4 embodiment, the blade has a number of openings 67 (one shown in FIG. 5). The cylinder 51' has one threaded opening 69 for every opening 67 in the blade 61. A set screw 65 is provided, preferably with a lip or protrusion to wedge the blade 61 against the inner wall 71 of the cylinder 51' when the set screw 65 is threaded into the opening 69. In this embodiment, once the blade 61 is worn out, it can be easily removed and replaced with another blade by removing the set screw 65, removing the old blade, installing a new blade, and reinserting the set screw 65.

The number of openings in the blade 61 and cylinder 51' can vary from at least two up to as many as eight or more. Fewer openings are desired since this makes it easier to remove and replace the blade.

It should also be understood that the attachment between the blade 61 and the cylinder 51' is exemplary, and other fastening techniques can be used to removably secure the blade 61 to the cylinder 51'. For example, a nut and bolt arrangement could be employed.

Although the dimensions for the device 50 can vary, preferred dimensions include a diameter of around 2 to 2.5 inches for the cylinder 51, 51', a length of about 12 to 15 inches for the rods with a rod diameter of about ¼ inch, and a length of about 4 to 6 inches for the handle, with a handle diameter of ¼ inch. The diameter of the cylinder should be just large enough to surround the anus and may vary depending on the animal being hunted. Some devices may have to have bigger diameters than others depending on size of the animals, and the devices could be made with different diameters to suit different animals. The rod length is important to since there must be enough space between the handle 59 and edge 55 to allow the cutting edge to pass around the anus and separate it from the animal body, with the handle or rods interfering with the path of travel of the cutting device when being used.

Further, while the handle and rods are described with a diameter, other cross sectional shaped members can be used, square, rectangular, etc.

Figure 6:
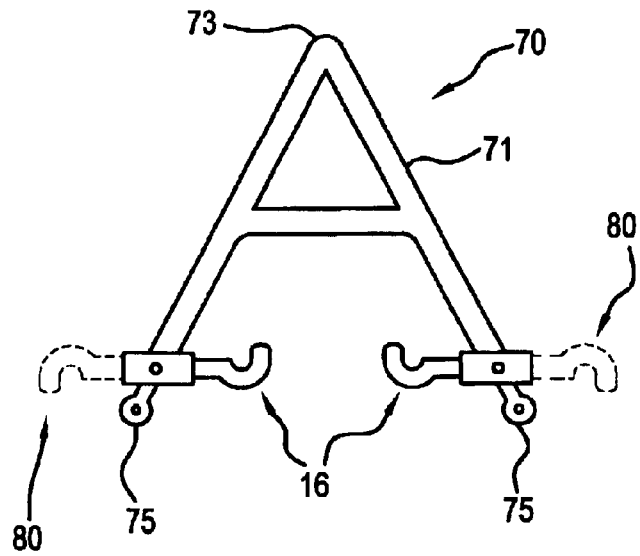
FIG. 6 shows a schematic view of another embodiment of the hanging device.

FIG. 6 shows another embodiment 70 wherein the handle is A-shaped, rather than the shape of FIG. 1. This embodiment is advantageous since the hooks 16 can be positioned as shown for a one-man drag, wherein the animal would connect to the peak of the frame at 73. In the position designated by the reference numeral 80, the hooks can be rotated for a two man drag wherein the animal or animals would be linked at points 75 using cables or the like. For hanging, the hooks 16 are rotated from the position designated by 80, just as shown in FIG. 1. The A-frame is advantageous in that it is easier to manufacture, and is a more compact design when one person is using it for dragging.

With a one man drag, only one hook or the like is needed to connect the animal to the a-frame, whereas a two man drag would employ a pair of hooks or the like.

As such, an invention has been disclosed in terms of preferred embodiments thereof which fulfills each and every one of the objects of the present invention as set forth above and provides new and improved hunting aids for field dressing and dragging and hanging the field dressed animal.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A combination drag and hook hunting aid comprising:
   a handle having a pair of opposing free ends, the handle also having means for supporting the handle;
   a pair of removable hooks attached to each free end of the handle, the hooks adapted to hook to an animal to allow the animal to be hung using the supporting means; and
   a flexible member extending from the handle, the flexible member terminating in a hook for attaching to a portion of an animal to allow the animal to be dragged using the handle;
   wherein each free end has a coupler with an opening to receive an attachment end of each removable hook, the removable hook retained in the opening by a pin extending through an opening in the coupler and an opening in the attachment end of the hook.

2. The combination drag and hook hunting aid of claim 1, wherein the flexible member is removably attached to each respective free end.

3. The combination drag and hook hunting aid of claim 1, wherein each removable hook can be rotated between a hooking position wherein a hook end faces upward for hanging, and a dragging position wherein the hook end faces either upward or downward to allow the hook end to be gripped for dragging.

4. The combination drag and hook hunting aid of claim 1, wherein a removable pin is employed to retain each removable hook in a portion of the handle and to permit hook rotation or repositioning.

5. The combination drag and hook hunting aid of claim 1, wherein the coupler is either an integral part of the handle or is attached thereto.

6. The combination drag and hook hunting aid of claim 1, wherein each free end has an eye opening to receive a portion of the flexible member.

7. The combination drag and hook hunting aid of claim 1, wherein the handle has an eye as the handle supporting means.

8. The combination drag and hook hunting aid of claim 1, wherein the handle is A-shaped.

9. A method of dragging and hanging an animal comprising:
   providing a handle having a pair of rotatable hooks on opposing free ends thereof and another free end;
   linking an animal to one of the free ends, and positioning a concave part of each hook to be grabbed by a user for dragging the animal;
   dragging the animal by said user to a location wherein one or more users grasps one or both of the hooks during dragging;
   after reaching the location, supporting the handle off the ground, and positioning the hooks so that free ends thereof can be used to hang the animal.

10. The method of claim 9, wherein the handle is supported using an eye on the handle or a peak of an a-frame shaped handle.

11. The method of claim 9, wherein one or more cables are used to link the animal to the handle for dragging.

12. The method of claim 9, wherein the hooks are rotated 180 degrees from a position for the dragging step to a position for the hanging step or moved from an internal position for the dragging to an external position for the hanging step.

* * * * *